United States Patent [19]

Streit

[11] 4,096,887
[45] Jun. 27, 1978

[54] MULTIBORE CONDUIT

[75] Inventor: Kenneth F. Streit, Mt. Prospect, Ill.

[73] Assignee: Phone-Ducs, Inc., West Chicago, Ill.

[21] Appl. No.: 709,491

[22] Filed: Jul. 28, 1976

[51] Int. Cl.$^2$ ............................................. F16L 9/22
[52] U.S. Cl. .................................... 138/117; 138/155; 138/172
[58] Field of Search ............................ 138/115–117, 138/155, 172, 173, 177, 178, DIG. 11, 153, 122; 177/207 R, 207 A; 285/279, 280

[56] References Cited

U.S. PATENT DOCUMENTS

| 372,487 | 11/1887 | Purves | 138/173 |
|---|---|---|---|
| 706,974 | 8/1902 | Lyle | 138/115 X |
| 1,025,186 | 5/1912 | Hill | 138/172 X |
| 2,477,533 | 7/1949 | Whiting | 277/207 A |
| 3,872,894 | 3/1975 | Streit | 138/117 |
| 3,941,157 | 3/1976 | Barnett | 138/115 |

FOREIGN PATENT DOCUMENTS 15,670 of 1896 United Kingdom ................. 138/173

Primary Examiner—Harry N. Haroian

[57] ABSTRACT

Conduit sections are provided which have multiple interior partition walls and which are adapted to be interconnected to form continuous passageways for underground cables. Each conduit section consists of a lightweight injection molded plastic material including an enclosing wall which has reinforcing thereon to aid in withstanding pressure and loads to which the sealed underground conduit may be subjected. The conduit section also has improved joint seal characteristics for interconnecting two sections.

8 Claims, 13 Drawing Figures

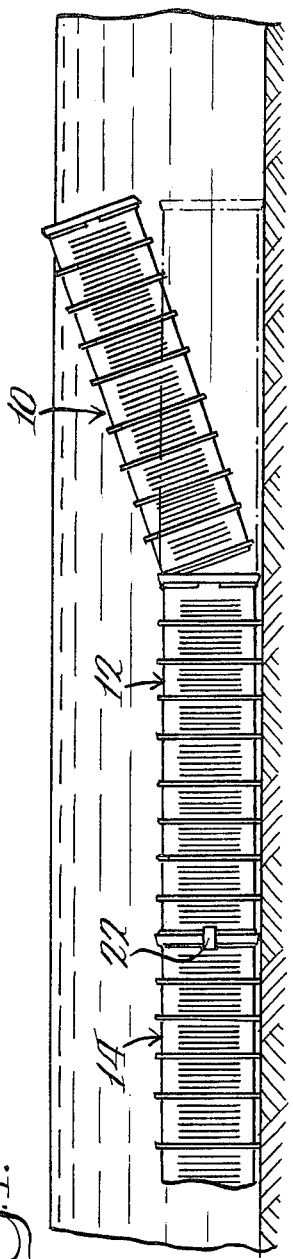
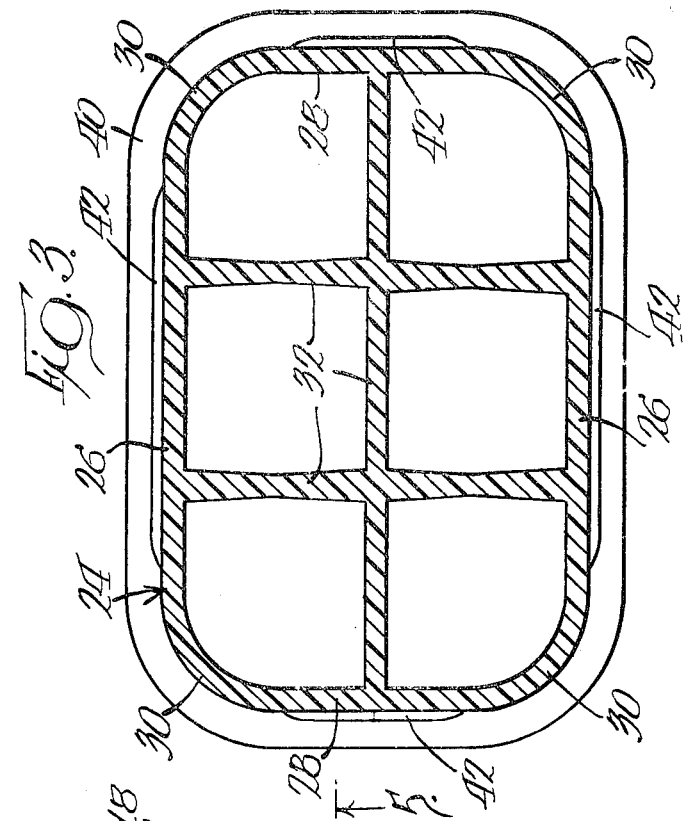
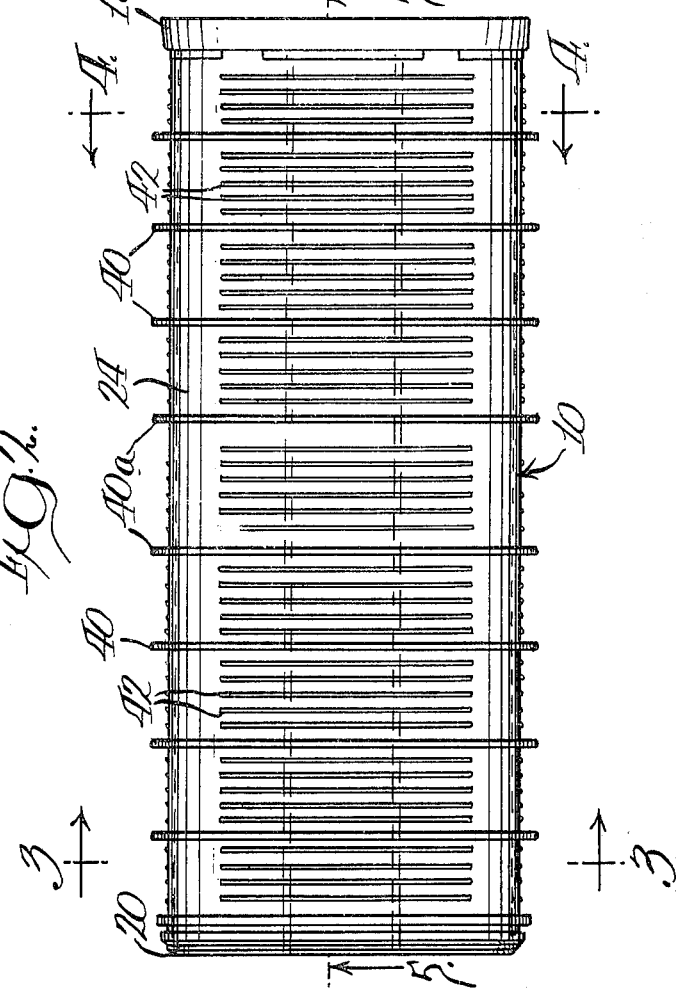

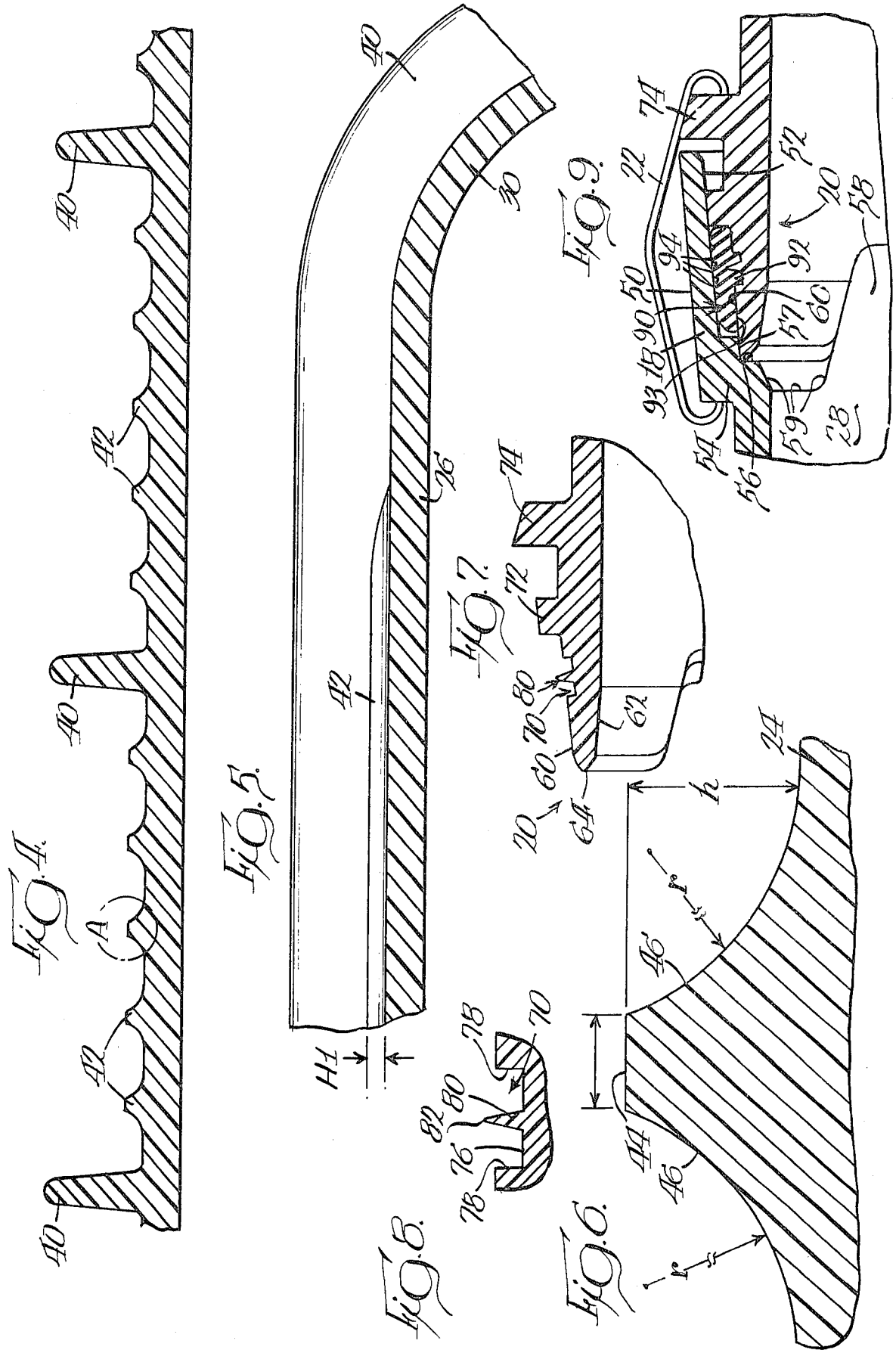

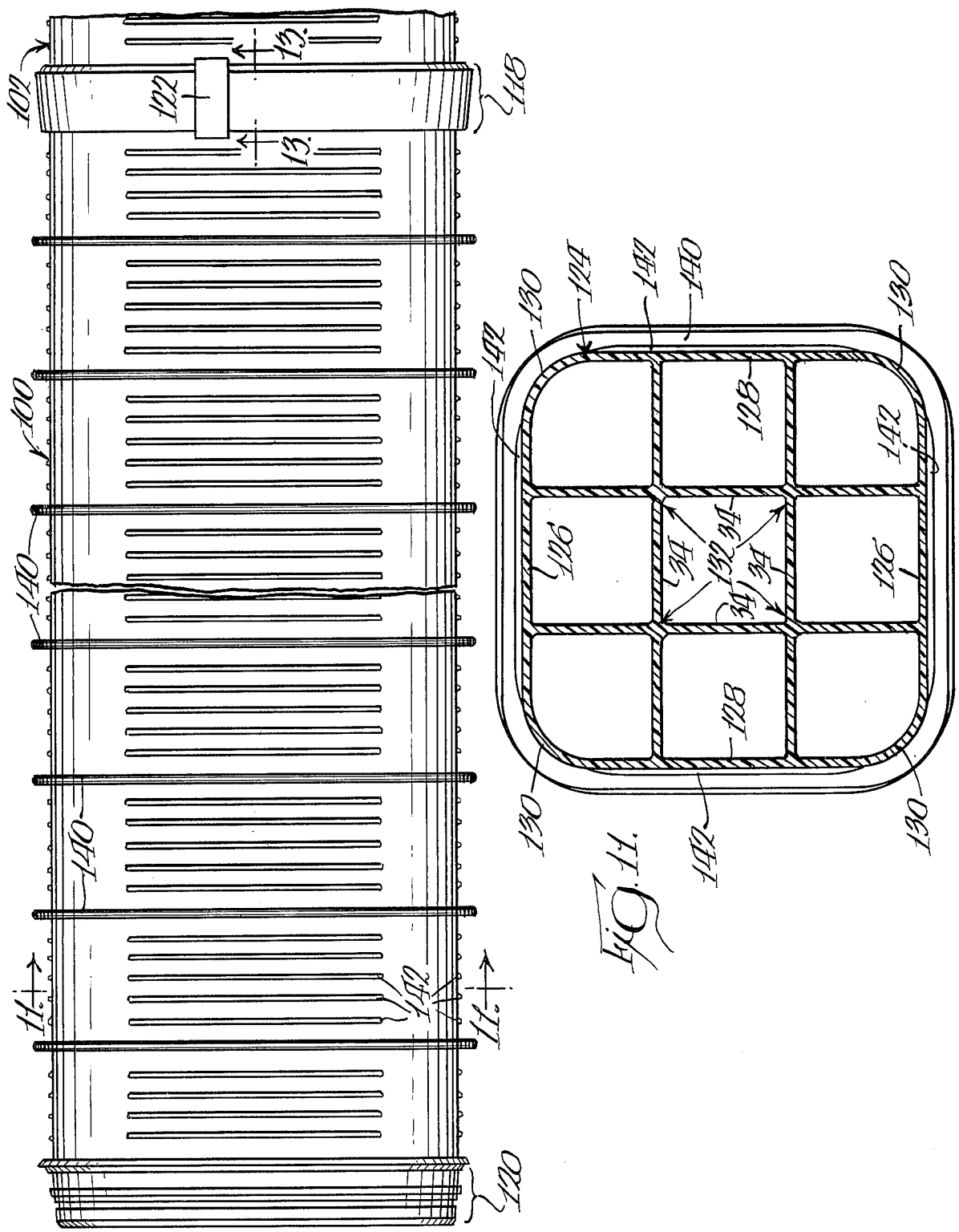

MULTIBORE CONDUIT

BACKGROUND OF THE INVENTION

This invention relates generally to conduit sections and more particularly to multipassageway conduit sections that are connected together and buried beneath the earth's surface to protect a plurality of cables.

Lightweight injection molded plastic conduit sections to which this invention is directed are disclosed in U.S. Pat. Nos. 3,872,894; 3,792,878, and 3,545,493, all assigned to the assignee of the present invention. These conduit sections may be conveniently connected end-to-end at the construction site to provide a multipassage conduit that houses a plurality of individual cables. This method of underground burial cables has found a remarkable degree of commercial success for underground burial of telephone and telegraph cables, computer data lines and television cables.

While these types of conduit sections provide a very satisfactory solution for protecting buried cables, manufacturers of such conduits are constantly striving to increase the quality of the product and reduce the cost of the overall individual sections without sacrificing the unique and desirable features of such conduit sections.

With increasing depths of burial and increasing conduit widths, greater pressure is presented on the conduit which results in increased pressure forces exerted on the walls of the conduit sections. Under extreme conditions, it has been found that stresses and failures have occurred in the walls of the conduit sections that may result in allowing water and other materials to enter into the passageways, which may damage the cable housed therein.

Of course, the obvious solution to such a problem would be go increase the wall thickness of the conduit sections to thereby increase the strength thereof. However, such a solution is undesirable for several reasons. Among other things, increasing the thickness of the walls results in an increased cost for the materials. Furthermore, the increased thickness of the walls would also result in increased weight of each conduit section which is undesirable particularly from an installation point of view.

SUMMARY OF THE INVENTION

A conduit section according to the present invention consists of an enclosing wall means that has integrally formed partition walls therein to divide the enclosed wall means into a plurality of passageways. The lightweight elongated injection molded plastic conduit section has a male end and a female end so that two similar conduit sections may readily be interconnected and produce a sealed joint. The multipassageway conduit section is of rectangular construction in cross section so that the enclosing wall means has first and second pairs of parallel walls. The enclosing wall means is reinforced by primary continuous ribs that extend transversely of the elongated dimension of the conduit section. According to the present invention, additional reinforcement of the walls is produced by specifically located ridges which are integral with the walls of the conduit section and are particularly configured to increase the strength thereof by a substantial amount without increasing the weight. More specifically, each of the ridges has a length which is substantially less than the width of the associated wall and the ribs are positioned to be intermediate opposite edges of the associated wall.

According to one aspect of the invention, the male end portion of the conduit section also has a specific configuration to improve the holding capacity for a gasket supported thereon.

Another embodiment of the invention has a novel flange on the male end portion of the conduit section for being located adjacent the female end portion of another similar section when the male end portion is inserted therein. The novel flange functions to protect the female end portion from impingement by external objects and to keep material away from the gasket sealed joint. Through an integral shoulder, the flange supports the female end under conditions when the female end is deflected inwardly under stress.

Numerous other advantages and features of the present invention will become readily apparent from the following detailed description of the invention and of one embodiment thereof, from the claims and from the accompanying drawings in which each and every detail shown is fully and completely disclosed as a part of this specification.

BRIEF DESCRIPTION OF THE SEVERAL VIEWS OF THE DRAWINGS

In the accompanying drawings forming part of the specification, and in which like numerals are employed to designate like parts throughout the same, FIG. 1 is an elevation view illustrating the installation of several conduit sections of a first embodiment of the present invention in a trench;

FIG. 2 is an enlarged plan view of one of the conduit sections of the first embodiment;

FIG. 3 is an enlarged transverse sectional view illustrating the internal construction and the reinforcement of the conduit section shown in FIG. 2.

FIG. 4 is an enlarged fragmentary sectional view of a portion of one of the walls, as viewed along the plane 4—4 of FIG. 2;

FIG. 5 is an enlarged fragmentary sectional view as viewed along the plane 5—5 of FIG. 2;

FIG. 6 is a further enlarged fragmentary view of the circled portion indicated by A in FIG. 4;

FIG. 7 is a fragmentary sectional view of the male end portion of the conduit section shown in FIG. 2;

FIG. 8 is an enlarged fragmentary sectional view of the male end shown in FIG. 7;

FIG. 9 is a view similar to FIG. 7 showing two adjacent similar conduit sections in an interconnected condition;

FIG. 10 is an elevation view illustrating a conduit section of a further embodiment of the present invention connected on one end to a similar section;

FIG. 11 is an enlarged sectional view illustrating the internal construction and the reinforcement of the conduit section as viewed along the plane 11—11 of FIG. 10;

DETAILED DESCRIPTION

Figure 12:
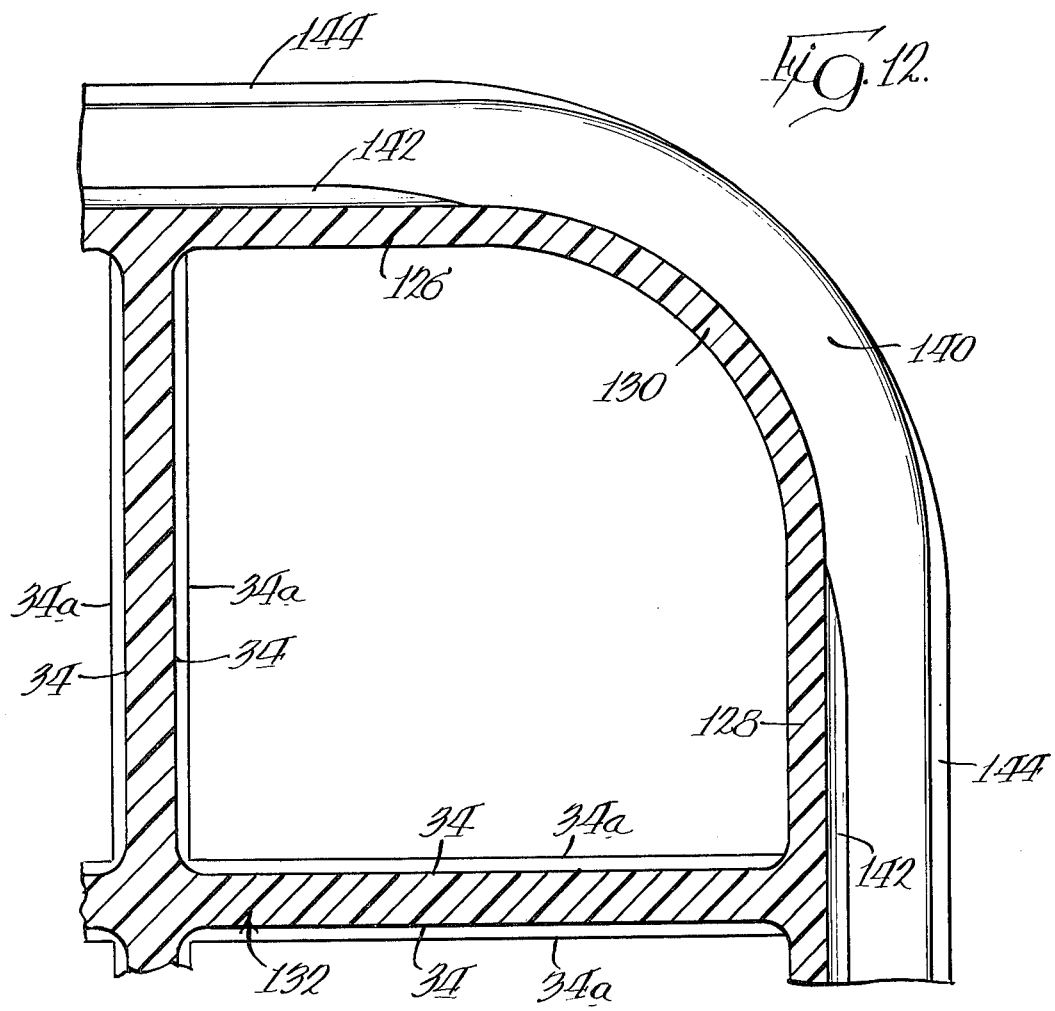
FIG. 12 is an enlarged fragmentary sectional view of the conduit section shown in FIG. 11.

While this invention is susceptible of embodiment in many different forms, there are shown in the drawings and will herein be described in detail preferred embodiments of the invention with the understanding that the present disclosure is to be considered as an exemplification of the principles of the invention and is not intended to limit the invention to the embodiments illustrated.

In the following description, two digit numerals are used to refer to the embodiment illustrated in FIGS. 1-9 and three digit numerals in the one hundred series are used to refer to the embodiment illustrated in FIGS. 10-13. The same last two digits in each numeral designate similar or functionally analogous elements in the various embodiments.

A first preferred embodiment is illustrated in FIGS. 1-9. Referring to FIG. 1, a plurality of conduit sections 10, 12 and 14 are illustrated in the manner in which they are installed in a trench that has been excavated to a desired depth. Each of the conduit sections illustrated in FIG. 1 is substantially identical in construction and configuration and is preferably made from a high impact plastic, such as linear polyethylene which may readily be injection molded.

As shown in FIG. 2, each of the sections includes a female end or portion 18 and a male end or portion 20 with the male end portion 20 being adapted to be received into the female portion 18 in sealing relation therewith as will be described later. The adjacent sections are secured together by means of a plurality of spring clips 22 (FIG. 1) positioned at spaced locations about the periphery of the joint in overlying relationship with the female portion 18 and the inserted male portion 20 of adjacent conduit sections.

The particular configuration of each conduit section is generally illustrated in FIGS. 2 and 3. Each conduit section consists of peripheral enclosing wall means 24 which includes a first pair of flat walls 26 and a second pair of generally flat parallel walls 28 perpendicular to walls 26 with adjacent ends of adjacent pairs of walls being interconnected by radial portions 30. The internal passage defined by enclosing wall means 24 is divided into a plurality of passageways (six in FIG. 3) by transverse partition wall means 32 which are injection molded integral with wall means 24 and which form a gridlike internal wall structure when viewed from the end of the conduit section.

According to one aspect of the present invention, walls 26 and 28 are reinforced in a specific manner to substantially increase the resistance of the walls to withstand pressure and loads to which the conduit may be subjected while buried below the ground. The particular construction and location of the reinforcing means substantially increases the impact resistance of the conduit sections while reducing the overall weight of the section by reducing the average density of the material that is utilized in injection molding of the product. Stated another way, the reinforcing means increases the impact resistance of the conduit section without any increase in the weight of the product and the particular configuration of the reinforcing means distributes the impact forces equally across the product.

The reinforcing means consists of a plurality of longitudinally spaced transversely continuous reinforcing ribs 40 that extend from the peripheral surface of enclosing wall means 24. In addition to the continuous ribs 40, the reinforcing means also includes a plurality of secondary ribs or ridges 42 extending from the peripheral surface of each of the walls 26 and 28. As illustrated in FIGS. 2 and 5, ridges 42 have a length which is substantially less than the dimension between opposite edges of the associated wall 26 or 28.

As illustrated in the drawings, the ridges 42 extend parallel to ribs 40 and there are a plurality of transversely extending ridges 42 between each adjacent pair of ribs 40. For example, FIG. 4 illustrates five equally spaced ribs between an adjacent pair of ribs 40 with the exception of the central pair 40a. The area between the central pair of ribs 40a has six ridges while area adjacent the male and female ends each have four ridges. All of the ridges or secondary ribs 42 for any given wall 26 or 28 are equal in length and identical in cross-sectional configuration.

As shown in FIG. 5, each ridge 42 has a substantially constant height throughout a major portion of the length thereof and has opposite ends of a generally curved configuration so that the opposite ends of the ridges 42 merge smoothly with the peripheral surface of enclosing wall means 24. As illustrated in FIGS. 2 and 5, the overall length of each ridge with respect to the width of the associated walls 26 or 28 is substantially greater than one-half and if preferably in the range of 60 to 75% of the width of the wall. The opposite ends of each ridge 42 are generally arcuate in the plane of their length and the arcuate portion has a radius on the range of approximately twenty times the height of the ridge.

The particular cross-sectional configuration of each ridge is illustrated in FIG. 6. As shown in FIG. 6, the cross-sectional configuration of each ridge consists of a flat portion 44 which extends parallel to the peripheral surface of the wall means 24 and this flat portion 44 is joined with the peripheral surface along fillets 46. Fillets 46 have a concave surface which has a substantially constant radius and the radius for concave surface is substantially greater than the height of the ridge. Preferably, the radius "r" of the concave surface of fillets 46 is approximately twice the height "h" of the ridge.

It will also be noted in FIG. 4 that the ribs 40 have a height that is substantially more than the height of the adjacent ridges 42. Preferably, the height of the ribs 40 with respect to the adjacent surface of wall means 24 is on the order of five to seven times the height "h" of the adjacent ridges 42. Also, the width of flat portion 44 is approximately one-half the height "h".

It has been found that the particular cross-sectional configuration and the general overall configuration of the ridges 42 will allow a manufacturer to produce a unit with substantially less material while increasing the overall strength of the conduit section.

According to another aspect of the present invention, the male and female ends or portions have a particular configuration to accommodate a sealing gasket and produce a sealed joint when two adjacent sections are interconnected. The male and female ends of adjacent sections are joined in the manner illustrated in FIG. 9 which is similar to the type of joint disclosed in U.S. Pat. No. 3,872,894, the portions of which are not inconsistent herewith being incorporated herein by this reference.

One end of each conduit section is formed by an enlarged outwardly flared female end or portion 18 which may be integrally formed with the enclosing wall means at the end thereof. As indicated in FIG. 9, outwardly flared portion 18 has two parallel surfaces 50 and 52 and is joined to the enclosing wall means by a generally L-shaped angular portion 54. The inner surface of L-shaped portion 54 has a pair of perpendicularly disposed surfaces 56 and 57. Also, end portions of partition wall means 32 project outwardly to produce the inclined projections 58 and cooperate with L-shaped portion 54 to produce a substantially U-shaped slot 59. Male end portion 20 is designed to be received into this U-shaped slot 59 as will be described later.

This cross-sectional configuration of male portion 20 is illustrated in FIG. 7 which shows an extension of the enclosing wall means 24 to provide surface 60 which tapers outwardly from the end of the conduit section. The inner surface 62 of the male end may also be flared outwardly at the juncture with surface 60 and may be tapered to produce a generally triangular shaped end portion having an apex 64.

Tapered surface 60 has a recess 70 which is generally rectangular in cross section and an outwardly extending support flange 72 spaced a predetermined distance from recess or groove 70, for a purpose that will be described later. A second flange 74 extends from enclosing wall means 24 and is continuous around the periphery of the conduit.

Rectangular recess or groove 70 is continuous around the periphery of male end 20 and has a bottom or base wall 76 and sidewalls 78 on opposite edges of the base wall 76. As illustrated best in FIG. 8, recess 70 also has projection means 80 integral with base wall 76 between opposite edges thereof and terminating in a point 82. The spike or projection 80 is triangular in cross-section and is continuous, extending the length of recess 70. An inspection of FIG. 8 shows that the triangular projection 80 has a bottom side integral with the bottom wall 76 of recess 70 and has two remaining sides which define an included angle which is substantially less than 90° so that the point 82 is rather sharp. Preferably, the included angle between the two sides of projection 80 is in the range of 30° to 45°.

As shown in FIG. 9, an annular shaped resilient sealing gasket 90 is positioned on tapered surface 60 and has a rib 92 extending from an internal surface 93 of the gasket and received into the annular recess 70. An inspection of FIG. 9 shows that projection 80 penetrates into rib 92, for a purpose that will be described later.

Gasket 90 also has a plurality of outwardly extending ribs 94 extending from its outer surface, and the width of gasket 90 is slightly less than the width of tapered surface 60. An inspection of FIG. 9 shows that the rib 92 on internal surface 93 of gasket 90 is spaced from one edge thereof by a dimension which is equal to the spacing between recess 70 and the adjacent surface of flange 72, so that the edge of the gasket bears against the surface of annular flange 72 when rib 92 is received into recess 70.

When the gasket 90 is inserted onto tapered surface 60 and is positioned as illustrated in FIG. 9, projection 80 penetrates into the rib 92 to provide a secondary seal between gasket 90 and surface 60, the primary seal being produced by the engagement of surfaces 60 and 93.

It has been found that the utilization of the projection in recess 70 performs two important functions. The circumferentially continuous projection 80 will penetrate or bite into the gasket 90 to produce an additional seal beyond the seal developed between surfaces 60 and 93. In addition, the projection 80 aids in preventing the gasket 90 from being moved on the surface during the relative movement between the female and male portions 18 and 20 which may result from uneven contour of the bottom of an earthen trench in which the conduit sections may be installed.

As shown in FIG. 9, the respective conduit sections are held in assembled relation by the spring clips 22 which have opposite legs in engagement with L-shaped portion 54 and flange 74 respectively.

A further preferred embodiment is illustrated in FIGS. 10–13. Referring to FIG. 10, a conduit section 100 is illustrated as connected on one end to a second similar section 102. Each of the conduit sections illustrated in FIG. 10 is substantially identical in construction and configuration and is preferably made from a high impact plastic, such as linear polyethylene which may readily be injection molded.

Each of the sections includes a female end or portion 118 and a male end or portion 120 with the male end portion 120 being adapted to be received into the female portion 118 in sealing relation therewith as will be described later. The adjacent sections are secured together by means of a plurality of spring clips 122 positioned at spaced locations about the periphery of the joint in overlying relationship with the female portion 118 and the inserted male portion 120 of adjacent conduit sections.

The particular internal configuration of each conduit section is generally illustrated in FIG. 11. Each conduit section consists of peripheral enclosing wall means 124 which includes a first pair of flat walls 126 and a second pair of generally flat parallel walls 128 perpendicular to walls 126 with adjacent ends of adjacent pairs of walls being interconnected by radial portions 130. The internal passage defined by enclosing wall means 124 is divided into a plurality of passageways (nine illustrated) by transverse partition wall means 132 which are injection molded integral with wall means 124 and which form a gridlike internal wall structure when viewed from the end of the conduit section. The transverse partition wall means 132 presents mutually perpendicular planar surfaces 134 forming substantially cross-sectionally square-shaped passageways, except for the passageways in each corner of the conduit 100 where the radial portion 130 of the enclosure wall means 124 causes a portion of such passageways to have an arcuate surface.

The surfaces 32 of the partition wall means 132, though planar, may be slanted inwardly along the longitudinal axis of the conduit from each end of the conduit to the middle. This provides "tapered" passageways wherein the passageways are larger on each end of the conduit than in the middle. The "taper" is illustrated in the enlarged view of FIG. 12 where the furthest inwardly extending surfaces of the partition wall means (at the middle of the length of conduit section) is designated as 34a.

According to the primary aspect of the present invention, walls 126 and 128 are reinforced in the specific manner, as previously described for the first embodiment, to substantially increase the resistance of the walls to withstand pressure and loads to which the conduit may be subjected while buried below the ground.

The reinforcing means consists of a plurality of longitudinally spaced transversely continuous reinforcing ribs 140 that extend from the peripheral surface of enclosing wall means 124. In addition to the continuous ribs 140, the reinforcing means also includes a plurality of secondary ribs or ridges 142 extending from the peripheral surface of each of the walls 126 and 128. As illustrated in FIG. 11, ridges 142 have a length which is substantially less than the dimension between opposite edges of the associated wall 126 or 128.

As illustrated in the drawings, the ridges 142 extend parallel to ribs 140 and there are a plurality of transversely extending ridges 142 between each adjacent pair of ribs 140. For example, FIG. 10 illustrates five equally spaced ribs between an adjacent pair of ribs 140. All of the ridges or secondary ribs 142 for any given wall 126 or 128 are equal in length and identical in cross-sectional configuration.

The configuration of each rib 140 and each ridge 142 is substantially the same as that of ridges 42 for the first embodiment previously described.

In this second embodiment additional, tertiary ribs 144 are formed integrally on the peripheral edge of each rib 140. In FIG. 12 the tertiary ribs 144 are shown on a rib 140 extending along each side of the conduit and merging with the rib 140 at the arcuate corners.

Figure 13:
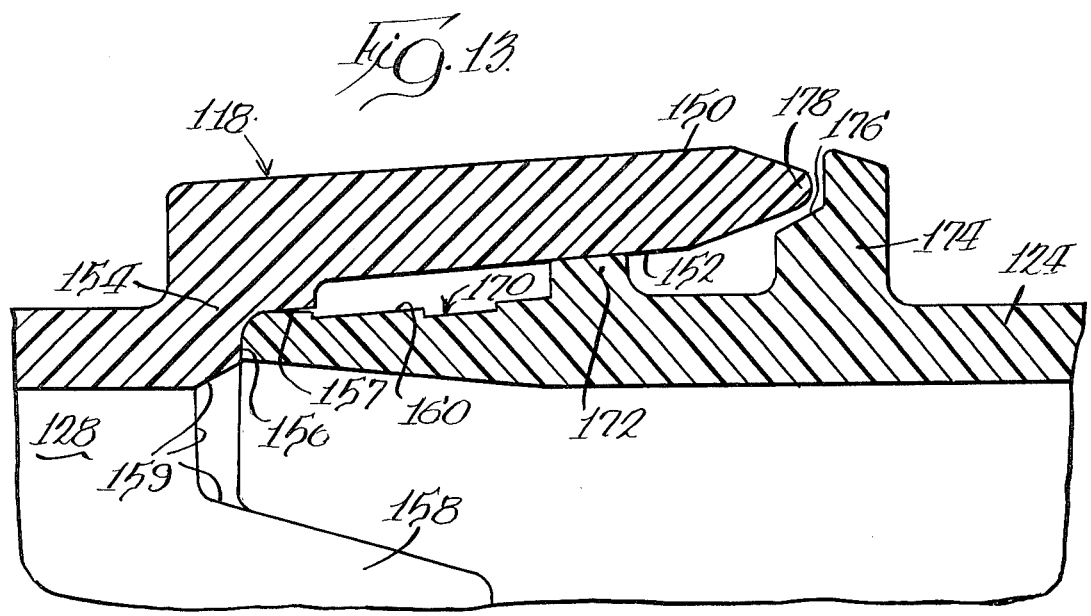
FIG. 13 is an enlarged fragmentary sectional view taken along the plane 13—13 of FIG. 10.

The male and female ends of adjacent sections are joined in the manner illustrated in FIG. 13 which is similar to the type of joint disclosed in the previous description of the first embodiment of the present invention and in U.S. Pat. No. 3,872,894, the portions of which are not inconsistent herewith being incorporated herein by this reference.

One end of each conduit section is formed by an enlarged outwardly flared female end or portion 118 which may be integrally formed with the enclosing wall means at the end thereof. As indicated in FIG. 13, outwardly flared portion 118 has two parallel surfaces 150 and 152 and is joined to the enclosing wall means by a generally L-shaped anuglar portion 154. The inner surface of L-shaped portion 154 has a pair of perpendicularly disposed surfaces 156 and 157. Also, walls 126 and 128 project outwardly from the end of the enclosing wall means 124 to produce the inclined projections 158 and cooperate with L-shaped portion 154 to produce a substantially U-shaped slot 159. Male end portion 120 is designed to be received into this U-shaped slot 159.

Male portion 120 includes an extension of the enclosing wall means 124 to provide an outer outwardly tapering surface 160. Tapered surface 160 has a recess 170 which is generally rectangular in cross section, and an outwardly extending support flange 172 spaced a predetermined distance from recess groove 172.

In use, a gasket, not illustrated in FIG. 13, is disposed on surface 160 to form a seal in the usual manner as described in the previously noted U.S. Pat. No. 3,872,894. Alternatively, the recess 170 can include a projection like the projection 80 shown in FIGS. 7 and 8 for effecting a gasket seal as described for such a first embodiment. In any case, a novel feature of the embodiment of FIGS. 10–13 is the shape and function of the second flange 174 extending from enclosing wall means 124. The second flange 174 is spaced from the first flange 172 and has a shoulder 176. When two similar lengths of conduit are joined toegther as illustrated in FIG. 13, the end 178 of the female portion 118 extends beyond the first flange 172 and is disposed in overlapping relationship with the shoulder 176 of the second flange 174. The end portions of surfaces 150 and 152 taper toward one another and merge in a rounded end 178 which nests within flange 174 above shoulder 176. Since the second flange 174 is not in contact with the end 178 of the female portion 118, there is no possibility of the flange 174 butting against surface 152 and raising it away from the first flange 172 which could destroy the integrity of any gasketed seal in the joint.

Further, since the flange 174 is relatively close to the end 178 of the female portion 118, it protects the end 118 from impingement by external objects and prevents external material (e.g. earthen matter or debris from a trench) from lodging under surface 152 and tending to raise surface 152 away from abutting engagement with flange 172 which could possibly destroy the integrity of the gasketed joint.

Additionally, should the conduit section experience external or internal loads tending to distory the cross-sectional shape of the joint area, the shoulder 176 acts as an abutment to prevent the end 178 of the female portion 118 from unduly deflecting inwardly about the fulcrum of flange 172 and destroying the integrity of the gasketed joint.

This type of configuration of the second flange 174 and of the extension of the free end 178 past the first flange thus has an overall effect of keeping material away from the gasketed, sealed joint area so as to protect the joint seal from influences which could destroy the integrity of the joint seal.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. An elongated lightweight injection molded plastic conduit section with male and female ends comprising: an enclosing wall means of given thickness having first and second pairs of generally flat parallel walls having adjacent ends interconnected by integral radial portions to define an elongated smooth surfaced, generally planar rectangular passage therein with partition wall means integral with said enclosing wall means to divide said passage into a plurality of elongated passageways, a plurality of longitudinally spaced transversely continuous reinforcing ribs extending outwardly from a peripheral surface of said enclosing wall means, said ribs extending completely around the periphery of said enclosing wall means, a plurality of transversely extending ridges extending outwardly from the peripheral surface each of said parallel walls, said ridges being spaced from one another and from said ribs and said ridges being parallel to said ribs and to one another with at least two elongated ridges on each wall between adjacent pairs of ribs, said ridges each having an elongated dimension less than the dimension between opposite edges of an associated wall with all of said ridges terminating in common planes extending generally parallel to said passageways and spaced from said radial portions, each of said ridges having a substantially constant height and cross-section throughout a major portion of the length thereof, each of said ribs having a constant height throughtout the length thereof with the height of said ribs being substantially greater than the height of said ridges, the enclosing wall means between said ribs and said ridges being flat and having said given thickness dimension.

2. The conduit section as defined in claim 1, in which said partition wall means divides said passage into six elongated passageways.

3. The conduit section as defined in claim 1, in which said partition wall means divides said passage into nine elongated passageways.

4. A conduit as defined in claim 1, in which said male end has a continuous recess in a peripheral surface, said recess being rectangular in cross section and having a base wall with sidewalls on opposite edges of said base wall, and a continuous projection extending from said base wall between opposite edges.

5. A conduit section as defined in claim 1, in which each ridge has a cross sectional configuration consisting of a substantially flat portion extending generally parallel to said peripheral surface with opposte edges of each flat portion being joined with said peripheral surfaces along fillets.

6. A conduit section as defined in claim 1, in which said ridges each have a length which is at least one half distance between opposite edges of an associated flat wall.

7. A conduit section as defined in claim 6, in which each flat wall has a plurality of said ridges between adjacent pairs of ribs and in which each ridge has a length in the range of 60 to 75% of the width of the associated wall.

8. A conduit section as defined in claim 5, in which said fillets define a concave surface having a radius that is approximately twice the height of said ridge.

* * * * *